US008332130B2

(12) United States Patent
Stretch (10) Patent No.: US 8,332,130 B2
(45) Date of Patent: Dec. 11, 2012

(54) LEAK DETECTION SYSTEM (76) Inventor: Dale Arden Stretch, Novi, MI (US)

( * ) Notice: Subject to any disclaimer, the term of this patent is extended or adjusted under 35 U.S.C. 154(b) by 711 days.

(21) Appl. No.: 12/567,154

(22) Filed: Sep. 25, 2009

(65) Prior Publication Data

US 2010/0082224 A1 Apr. 1, 2010

Related U.S. Application Data (60) Provisional application No. 61/101,323, filed on Sep. 30, 2008.

(51) Int. Cl.
*G06F 19/00* (2011.01)
*G01M 3/26* (2006.01)
*F02D 41/22* (2006.01)

(52) U.S. Cl. ...... 701/114; 701/103; 123/479; 73/40.5 R; 702/51; 702/185

(58) Field of Classification Search .............. 123/198 D, 123/445, 478–480, 494, 506; 701/103, 104, 701/114; 73/37, 40, 40.5 R; 702/51, 182, 702/183, 185; 239/5, 88, 93, 124, 533.7
See application file for complete search history.

(56) References Cited

U.S. PATENT DOCUMENTS

| 2,362,822 | A | * | 11/1944 | Hancock et al. | 239/93 |
|---|---|---|---|---|---|
| 3,183,723 | A | * | 5/1965 | Deters | 73/40.5 R |
| 4,099,894 | A | * | 7/1978 | Indra | 417/499 |
| 5,267,470 | A | | 12/1993 | Cook | |
| 5,320,508 | A | | 6/1994 | Kiefer | |
| 5,361,622 | A | | 11/1994 | Wall | |
| 5,467,641 | A | | 11/1995 | Williams et al. | |
| 5,708,202 | A | | 1/1998 | Augustin et al. | |
| 5,823,429 | A | * | 10/1998 | Beck et al. | 239/5 |
| 5,974,865 | A | | 11/1999 | Dambach | |
| 6,062,066 | A | * | 5/2000 | Loen | 73/37 |
| 6,389,901 | B1 | | 5/2002 | Joos et al. | |
| 2008/0245058 | A1 | | 10/2008 | Boddy et al. | |
| 2009/0114864 | A1 | | 5/2009 | Scheffer | |
| 2010/0089127 | A1 | | 4/2010 | Farnsworth | |

FOREIGN PATENT DOCUMENTS

JP 6213051 A1 8/1994

* cited by examiner

*Primary Examiner* — Willis R Wolfe, Jr.
(74) *Attorney, Agent, or Firm* — Paul V. Keller (57) ABSTRACT

An injection system includes an injector, first valve, second valve, and pressure sensing device. In an embodiment, first valve is in communication with an injector outlet and includes a closed position for at least partially stopping fluid flow from injector outlet. The second valve is in communication with an injector inlet and includes a closed position for at least partially stopping fluid flow to injector inlet. The pressure sensing device is configured for sensing an injector inlet pressure drop of the injector. The injection system may be configured to stop or impede fluid flow to injector inlet when the rate of pressure drop measured by the pressure sensing device is at least equal to a predetermined pressure value that represents a rate of pressure drop measured between injector inlet and second valve when the first valve and second valve are in the closed position.

20 Claims, 4 Drawing Sheets

LEAK DETECTION SYSTEM

RELATED APPLICATION

This application claims the benefit of U.S. Provisional Patent Application No. 61/101,323 filed Sep. 30, 2008, hereby incorporated by reference in its entirety.

TECHNICAL FIELD

The present disclosure relates in general to hydraulic systems, including a system for detecting and preventing a leak in a hydraulic system.

BACKGROUND

Exhaust gas after treatment systems are commonly used in conjunction with diesel engines for reducing the amount of nitrous oxides ($NO_x$) in an exhaust gas. One type of after treatment system includes an injector for spraying a reduction agent, such as ammonia, fuel or urea, into the exhaust gas. The exhaust gas is then transported to a catalytic converter where the amount of nitrous oxides in the exhaust gas are reduced as the reduction agent reacts with the nitrous oxides in the exhaust gas to form water and nitrogen. After reacting in the catalytic converter, the exhaust gas is released from the catalytic converter and into the atmosphere.

One problem that may occur with the after treatment system is when the reduction agent leaks out of the after treatment system. In particular, the reduction agent may leak from the after treatment system before reaching the injector. Another problem that may occur with the after treatment system is that the injector may leak the reduction agent from an injection orifice, allowing reduction agent to escape into the exhaust gas. The reduction agent may leak from the injection orifice even when the after treatment system commands the injector not to release the reduction agent into the exhaust gas.

SUMMARY

A injection system may include an injector including an injector inlet and an injector outlet; a first valve in communication with the injector outlet; a second valve in communication with the injector inlet; and a pressure sensing device configured for sensing an inlet pressure drop of the injector over a period of time. The first valve may include a closed position for at least partially stopping fluid flow from the injector outlet. The second valve may include a closed position for at least partially stopping fluid flow to the injector inlet. The injection system may be configured for at least partially stopping fluid flow to the injector inlet when the rate of pressure drop measured by the pressure sensing device is at least equal to a predetermined pressure value that represents a rate of pressure drop measured between the injector inlet and the second valve when the first valve and the second valve are in the closed position.

A method of detecting a leak in an injection system may comprise the steps of: transporting a fluid from an on/off valve to an injector, and from the injector to a check valve, wherein the injector includes an injector inlet and an injector outlet; closing the on/off valve to at least partially stop the fluid from flowing to the injector inlet, and closing the check valve to at least partially stop the fluid from flowing from the injector outlet; measuring an injector inlet pressure drop of the injector, wherein the pressure drop is measured at least twice when the on/off valve and the check valve are each in the closed position; comparing the pressure drop with a predetermined pressure value, wherein the predetermined pressure value is a rate of pressure drop between the injector inlet and the on/off valve; and at least partially stopping fluid flow to the injector inlet when the rate of pressure drop of the injector inlet is at least equal to the predetermined pressure value.

BRIEF DESCRIPTION OF THE DRAWINGS

Embodiments of the invention will now be described, by way of example, with reference to the accompanying drawings, wherein.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as embodied by the appended claims.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 1:
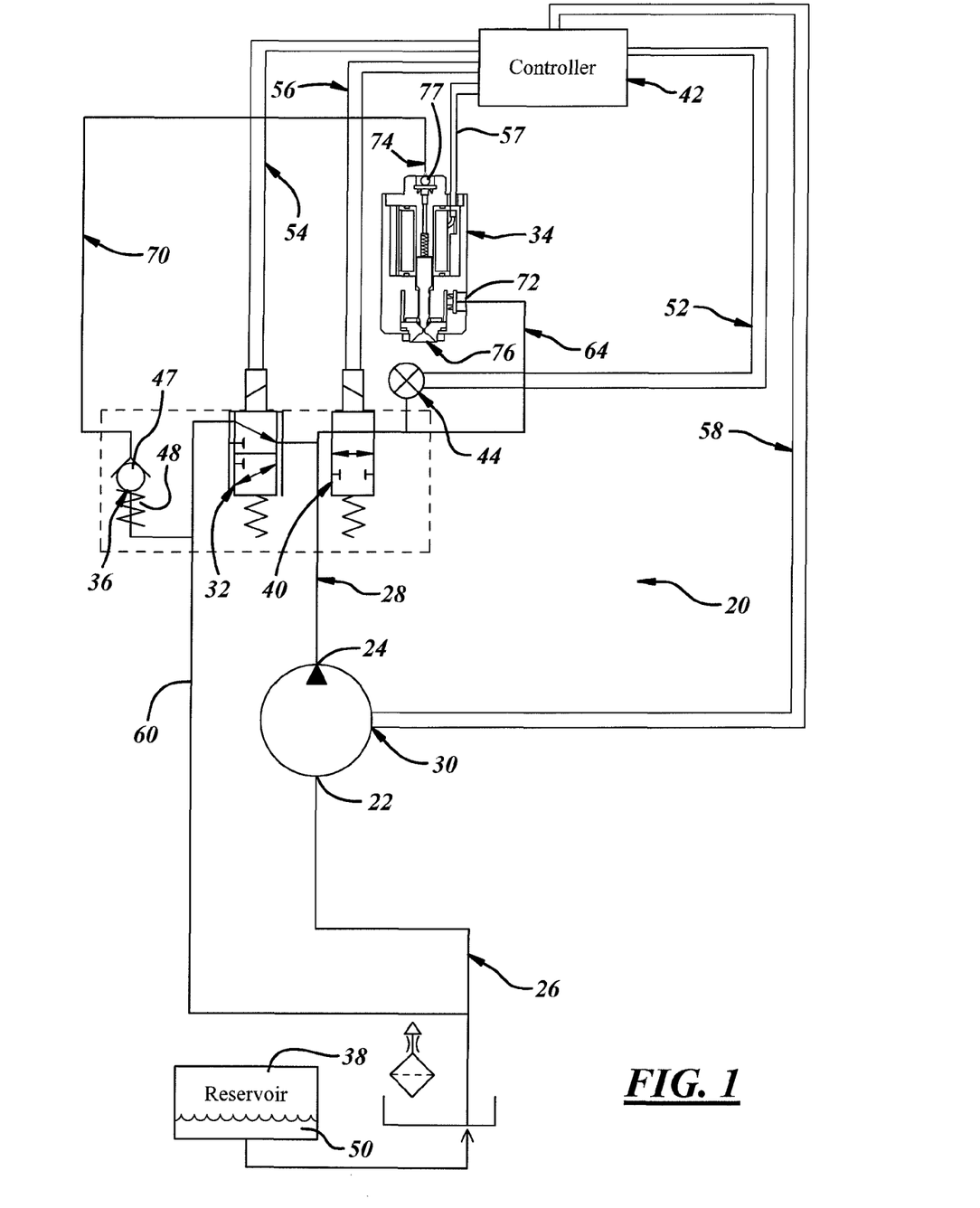
FIG. 1 is a schematic view of a injection system configured for operation in a leak detection mode in accordance with an embodiment of the invention.

Turning now to the drawings, FIG. 1 schematically illustrates an exemplary injection system 20. The exemplary injection system 20 may be employed in a variety of applications, including but not limited to, fuel injection systems and dosing systems, among others. The injection system 20 may include a pump 30, a pressure regulating valve 32, a fluid injector 34, a first valve 36 (e.g., a check valve 36), a reservoir 38 of fluid 50, a second valve 40 (e.g., an on/off valve 40), a controller 42 and a pressure sensor 44. A fluid 50 may flow through the injection system 20, and may be selectively discharged from the injector 34. The fluid 50 may be any fluid or gas appropriate for the particular application, including but not limited to, ammonia, fuel, or urea, such as may be used in a fuel injection or dosing system. The pump 30 may move the fluid 50 from the reservoir 38 to the injector 34.

The pump 30 may supply a flow of pressurized fluid 50 to the injection system 20. The pump may include a pump inlet 22 fluidly connected to reservoir 38 and a pump outlet 24 through which the pressurized fluid 50 is discharged. The pump 30 may receive the fluid 50 from the reservoir 38 through a receiving line 26 fluidly connected to the pump inlet 22. The pump 30 may be a fixed displacement pump, which may include, but is not limited to, a gear pump, vane pump, axial piston pump, or a radial piston pump. The pump 30 may operate to produce a flow of the fluid 50 at a given operating speed. It will be appreciated, however, that other types of pumps, such as a variable displacement pump, may be used for supplying a flow of pressurized fluid.

The injection system 20 may further include a pump delivery line 28 fluidly connecting pump outlet 24 to the pressure regulating valve 32 and the on/off valve 40. Pressurized fluid 50 discharged from the pump 30 may flow through the pump delivery line 28 to one of the pressure regulating valve 32, the on/off valve 40, or both. The pump delivery line 28 may split into two separate branches, one branch being fluidly connected to the pressure regulating valve 32 and the other branch to the on/off valve 40. A portion of the fluid 50 discharged from the pump 30 may be delivered to the pressure regulating valve 32 and a portion of the fluid 50 may be delivered to the on/off valve 40.

The pressure regulating valve 32 may be used to at least partially control the pressure of the fluid 50 delivered to the injector 34. The pressure regulating valve 32 may be selectively adjusted between an open position and a closed position. In the fully open position or fully closed position, the pressure regulating valve 32 may also fully control the pressure of the fluid 50 delivered to the injector 34. The pressure of the fluid 50 delivered to injector 34 may be controlled by opening the pressure regulating valve 32 to allow a portion of the fluid 50 from the pump delivery line 28 to bypass the on/off valve 40, and instead pass though the pressure regulating valve 32. The fluid 50 may be transported back to the reservoir 38 by way of a reservoir inlet line 60, which fluidly connects the pressure regulating valve 32 to the reservoir 38. The remaining portion of fluid 50 that is not transported through the pressure regulating valve 32 may be transported through the on/off valve 40 to a pressure line 64. The pressure line 64 may fluidly connect an exit port of the on/off valve 40 to an inlet port of injector 34. The pressure level in the pressure line 64 may be controlled by regulating the amount of the fluid 50 that is redirected from the pump delivery line 28 back to reservoir 38. The pressure regulating valve 32 may at least partially control the pressure in the pressure line 64 by selectively allowing a portion of the fluid 50 to flow from the pump delivery line 28 into the reservoir inlet line 60. The pressure level in the pressure line 64 may be decreased by increasing the amount of fluid transported from the pump delivery line 28 to the reservoir 38, whereas decreasing the flow of the fluid 50 to the reservoir 38 may increase the pressure in the pressure line 64. It will be appreciated that this is only one approach for controlling the pressure of the fluid delivered to injector 34, and that other approaches may also be employed depending on the requirements of the particular application. For example, the pressure regulating valve 32 may be omitted from the injection system 20, and the pressure and flow of the fluid 50 may be controlled by varying the speed of the pump 30.

The flow of the fluid to the injector 34 may be further controlled by the on/off valve 40. The on/off valve 40 may be selectively adjusted between an open position and a closed position. The on/off valve 40 may at least partially block or substantially block the flow of the fluid 50 to the pressure line 64 when the on/off valve 40 is closed, or in an off position. Conversely, when the on/off valve 40 is in an open position the on/off valve 40 may allow the fluid 50 to flow from the pump delivery line 28 to the injector 34 through the pressure line 64 in an on position. Although the second valve 40 is described as an on/off valve 40 in accordance with an embodiment of the invention, the second valve 40 may comprise a flow valve, variable flow valve, a pressure control valve, or any other variety of valves that may be employed in other embodiments of the invention.

Figure 2:
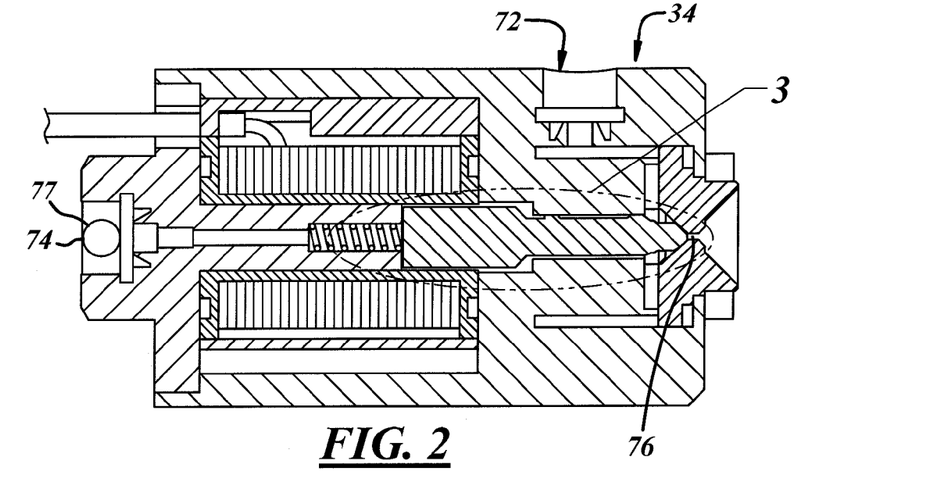
FIG. 2 is a cross-sectional view of a fuel injector of the injection system of FIG. 1.
Figure 3:
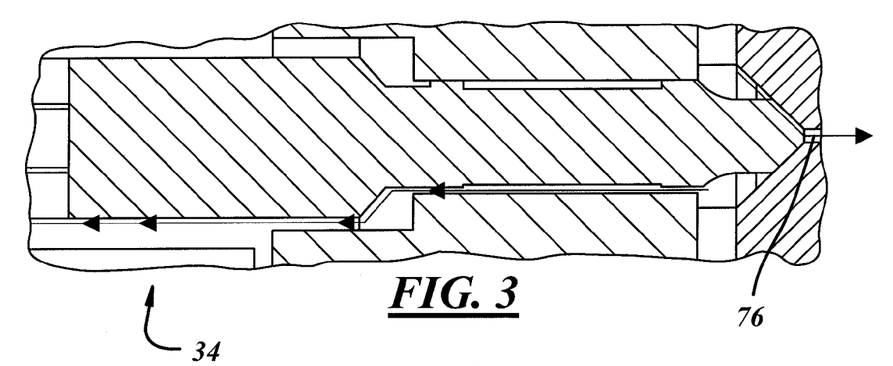
FIG. 3 is an enlarged view of a portion of the fuel injector of FIG. 2.

Referring now to FIGS. 1-3, the injector 34 may include an injector inlet 72, an injector outlet 74, and an injection orifice 76. Referring again to FIG. 1, the pressure line 64 for supplying pressurized fluid to the injector 34 may be fluidly connected to the injector inlet 72. Referring again to FIGS. 1-3, the fluid 50 may enter the injector 34 from the injector inlet 72 and may exit the injector 34 through either the injection orifice 76 or the injector outlet 74. The injector 34 may be selectively cycled between an open position and a closed position. The fluid 50 may be discharged from the injection orifice 76 when operating the injector 34 in the open position, and may exit the injector 34 through the injector outlet 74 when operating the injection orifice 76 (e.g., when operating the injector 34 in the closed position).

Referring now to FIGS. 1-2, the injector 34 may include a metering orifice 77 arranged upstream of the injector outlet 74 in an embodiment of the invention. The metering orifice 77 may create a restriction in the flow path between the injector inlet 72 and the injector outlet 74 for at least partially controlling the pressure and flow of fluid through the injector 34. Increasing the restriction by reducing the flow area of the orifice 77 may generally produce a decrease in fluid flow through the injector 34 at a given pressure. On the other hand, increasing the flow area of the orifice 77 may generally result in an increase in flow through the injector 34 at a given pressure.

The injection orifice 76 may be suitably configured to discharge the fluid 50 as a fine mist. When employing the exemplary injection system 20 as part of a dosing system, the mist may be discharged into an exhaust gas stream. The fluid 50 may also exit the injector 34 through the injector outlet 74, and may be transported to the reservoir 38 through the outlet line 70 and the reservoir inlet line 60.

Disposed within the outlet line 70 may be the check valve 36, which may be in fluid communication with the injector outlet 74. The fluid 50 discharged from the injector outlet 74 may flow through the outlet line 70 to the check valve 36. The check valve 36 may have any of a variety of different configurations depending on the requirements of the particular application. The check valve 36 may operate to restrict flow in one direction while selectively limiting flow in the opposite direction. For example, the check valve 36 is shown arranged so as to block flow from passing through the valve in the direction from the reservoir inlet line 60 to the injector outlet line 70, while allowing flow in the opposite direction under limited circumstances. The check valve 36 may include a closed position, wherein the check valve 36 may be configured for at least partially blocking the fluid 50 flowing from the injector outlet 74 to reservoir 38. One exemplary configuration of the check valve may include a restriction element 47 (e.g., a ball) that may be biased to a closed position by means of a biasing mechanism 48 (e.g., a biasing spring). The biasing force exerted by a biasing mechanism 48 may determine the pressure level at which the valve 36 begins to open. The check valve 36 may begin to open when the pressure within the outlet line 70 exceeds the biasing force applied to the restriction element 47, thereby allowing flow to pass from the outlet line 70 to the reservoir inlet line 60. In one example, the check valve 36 may be configured to begin opening at a pressure of about 80 psi (0.551 MPa), or another desired pressure. It should be noted, however, that the check valve 36 may be set to open at various desired pressure values. It shall be appreciated that the check valve 36 is merely one example of the variety of valves that may be employed with an injection system. The pressure regulating valve 32, the first valve 36 (e.g., check valve 36), and the second valve 40 (e.g., on/off valve 40) may comprise any of various valves in accordance with different embodiments of the injection system 20.

The operation of the injection system 20 may be controlled by the controller 42, which can be configured to monitor and control the operation of the pressure regulating valve 32, the on/off valve 40, the pump 30, and/or the injector 34. A connector 58 may operably connect the pump 30 to the controller 42. The connector 58 may be used for providing power, such electricity, for driving the pump 30. In addition, electronic information concerning the operating characteristics of pump 30, such as speed and output pressure, for example, may be transmitted over the connector 58 from the pump 30 to the controller 42.

The connectors 54 and 56 may operably connect the pressure regulating valve 32 and the on/off valve 40, respectively, to the controller 42. The connector 57 may operably connect the injector 34 to the controller 42.

The pressure sensor 44 may be provided for detecting the pressure in the pressure line 64. The pressure sensor 44 may be configured to send a signal indicative of the pressure within the pressure line 64 to the controller 42. The controller 42 may generate various control signals for controlling the operation of the various system components, including but not limited to, the pressure regulating valve 32, the on/off valve 40 and the injector 34, based at least in part on the pressure information received from the pressure sensor 44. For example, it may be desirable that the inlet pressure to the injector 34 be maintained at a desired level. The controller 42 can monitor the pressure within the pressure line 64 using the pressure sensor 44. Based on the pressure information received from the pressure sensor 44, the controller 42 can formulate an appropriate control signal for controlling the operation of the pressure regulating valve 32 to maintain the desired inlet pressure to the injector 34.

The controller 42 may also be configured to control a duty cycle of the injector 34. The controller 42 may either pass through or formulate an appropriate control signal specifying the timing and duration of the opening and closing of the injector 34.

Continuing to refer to FIG. 1, the injection system 20 may be operated in a leak detection mode for evaluating whether the injection system may be leaking fluid. In general, the leak detection mode may involve pressurizing at least a portion of the injection system 20 to a predetermined pressure and monitoring the pressure level within the pressurized region over a period of time. A loss of pressure within the pressurized region may indicate the presence of a leak. Upon detecting a leak, the controller 42 may be configured to deactivate the injector system, or take other appropriate action. The on/off valve 40, the pressure sensor 44, the pressure line 64, the injector 34, the outlet line 70, and the check valve 36 may cooperate in determining whether a leak exists in the injection system 20.

The portion of the injection system 20 being checked for leaks may be affected by the placement of the on/off valve 40 and the check valve 36 within the fluid network. In the exemplary injection system 20, the portion of the fluid circuit that may be checked for leaks may extend from the on/off valve 40 to the check valve 36, and may include the pressure line 64, the injector 34, and the outlet line 70. However, other portions of the injection system 20 may be checked for leaks in accordance with other embodiments of the invention and the location of the valves (e.g., first valve 36 and second valve 40) may be different in accordance with other embodiments of the invention.

With the pump 30 operating to supply pressurized fluid to the injector 34, the leak detection mode may be initiated by closing the injector 34 and the on/off valve 40. The pressure regulating valve 32 may also be opened to reduce the inlet pressure to the on/off valve 40, which may minimize the possibility of fluid leaking through the on/off valve 40 from the pump delivery line 28 to the pressure line 40. Closing the on/off valve 40 may substantially stop the supply of the fluid 50 to the injector inlet 72. Assuming that the pressure within outlet line 70 is higher than the actuation pressure of check valve 36 prior to closing on/off valve 40, with the on/off valve 40 closed (thereby causing the check valve to initially be at least partially open), the pressure within the outlet line 70 may continue to drop as the fluid 50 passes through the open check valve 36 to the reservoir inlet line 60. As the pressure in the outlet line 70 approaches the activation pressure of the check valve 36, the check valve 36 may begin to close and at least partially block the flow of the fluid 50 to the reservoir inlet line 60. The check valve 36 may be fully closed once the pressure within the outlet line 70 reaches the activation pressure of the check valve 36, thereby substantially restricting any flow of fluid from the injector outlet line 70 to the reservoir inlet line 60. At this point of the leak detection mode, both the check valve 36 and the on/off valve 40 may be closed, and the pressurized fluid 50 present in the pressure line 64, the injector 34 and the outlet line 70, may be trapped between the check valve 36 and the on/off valve 40.

The leak detection mode may continue to proceed by monitoring the pressure level within the pressure line 64 using pressure sensor 44. The controller 42 may monitor the pressure drop in the pressure line 64 over a period of time using pressure sensor 44. The controller 42 may take at least two pressure measurements in the pressure line 64 after the check valve 36 and the on/off valve 40 have closed. The pressure in the pressure line 64 may be compared against a predetermined pressure value to arrive at a detected pressure drop. The predetermined pressure value may be any specified, particular, and/or precise pressure value and may vary in accordance with different embodiments of the invention. The predetermined pressure value may represent a rate of pressure drop measured between the injector inlet 72 and the second valve 40 when the first valve 36 and the second valve 40 are in the closed position. If there is a leak in the section of the injector system being tested, the resulting fluid loss may produce a corresponding drop in pressure. A detected drop in pressure may thus signal the presence of a leak. If a leak is detected, the controller 42 may be configured to take appropriate action, which may include, but is not limited to, turning off the pump 30, maintaining the on/off valve 40 in the closed position, and/or opening the pressure relief valve 32. In one illustration the on/off valve 40 may be closed while the pressure relief valve 32 is open, thereby allowing substantially all of the fluid 50 to flow from the pump delivery line 28 to the reservoir inlet line 60. Keeping the pressure relief valve 32 open when the on/off valve 40 is closed may cause the pressure in the pump delivery line 28 to decrease. Decreasing the pressure in the pump delivery line 28 may be desirable, as decreasing the pressure may minimize any leakage of the fluid 50 through the on/off valve 40, when the on/off valve 40 is in the closed position. The predetermined pressure value used for determining the presence of a leak may be programmed into or stored in the memory of the controller 42.

Figure 4:
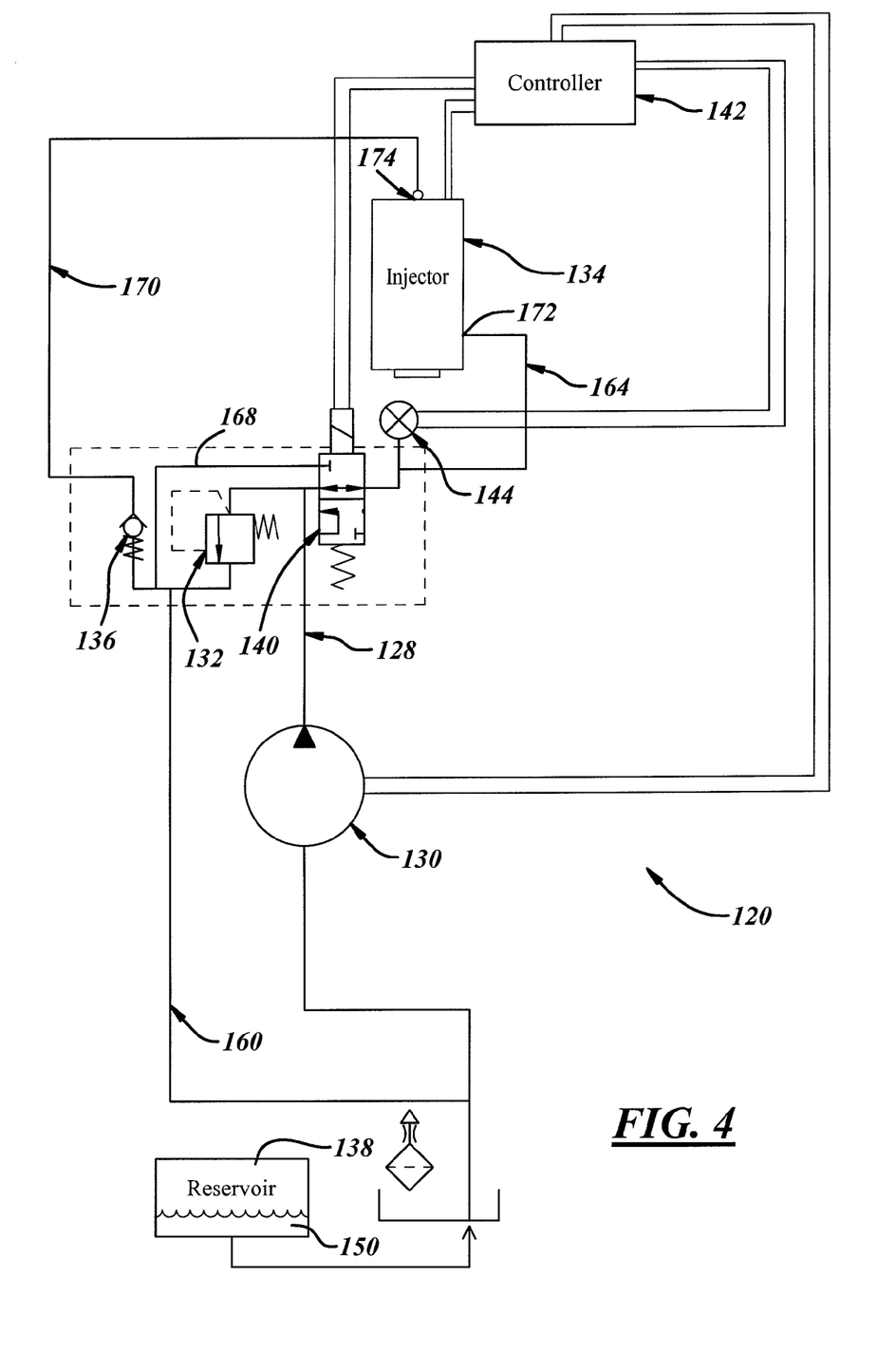
FIG. 4 is a schematic view of an injection system configured for operation in a leak detection mode in accordance with an embodiment of the invention.

Referring to FIG. 4, an injection system 120 may include a pump 130, a mechanically actuated pressure regulating valve 132, an injector 134, a first valve 136 (e.g., a check valve 136), a reservoir 138 of fluid 150, a second valve 140 (e.g., an on/off valve 140), a controller 142 and a pressure sensor 144 in accordance with an embodiment of the invention. A fluid 150 may flow through the injection system 120. A pressure line 164 may transport the fluid 150 from the on/off valve 140 to the injector 134. An outlet line 170 may transport the fluid 150 from the injector 134 to the reservoir 138. A pressure backflow line 168 may be provided for transporting the fluid 150 from the on/off valve 140 to the reservoir 138 when the on/off valve 140 is in a closed position. The pressure backflow line 168 may fluidly connect on/of valve 140 to the reservoir inlet line 160.

During operation of the injection system 120, the on/off valve 140 may re-direct the flow of fluid 150 through the pressure backflow line 168 for delivery to a reservoir inlet line 160 when the on/off valve is in the closed position. This may occur, for example, when the injection system 120 is operated in the leak detection mode and the on/off valve 140 is closed. With the on/off valve 140 closed, flow from the pump 130 may be substantially blocked from entering the pressure line 164. When operating the injection system 120 in the leak detection mode, the fluid 150 may flow from the on/off valve 140 through the pressure backflow line 168 to the reservoir inlet line 160. As the fluid 150 is transported through the pressure backflow line 168 and into the reservoir inlet line 160, the pressure in the pump delivery line 128 may be decreased, thereby minimizing any leakage that may occur through the on/off valve 140 into the pressure line 164. The fluid 150 may travel through the reservoir inlet line 160 to the reservoir 138.

Continuing to refer to FIG. 4, the injection system 120 may also include a mechanically actuated pressure regulating valve 132. The pressure regulating valve 132 may be operable for controlling the pressure of the fluid delivered to injector 134. The pressure regulating valve 132 may sense a pressure of the fluid 150 present in the pump delivery line 128, and may adjust the sensed pressure accordingly to achieve a desired pressure level. This may be accomplished by selectively varying the amount of fluid being returned to the reservoir 138 through the pressure regulating valve 132 in response to change in flow through the injector 134.

Figure 5:
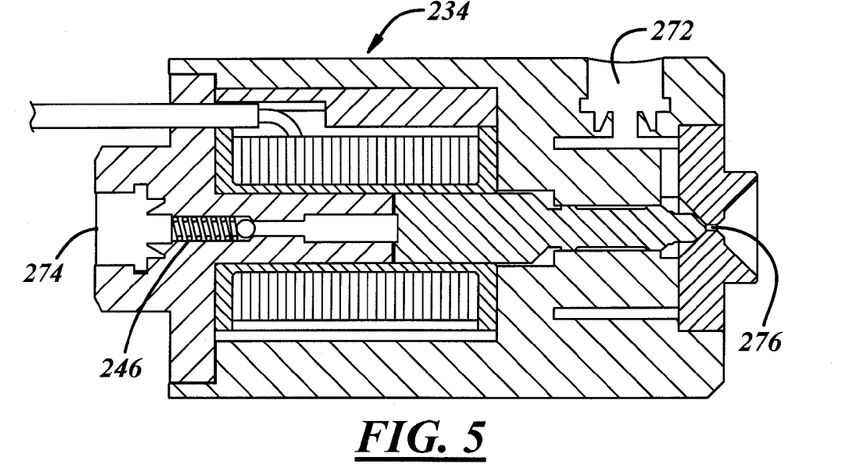
FIG. 5 is a cross-sectional view of a fuel injector that may be suitable for use in connection with the injection system of FIG. 1 or FIG. 4.

Referring to FIG. 5, an injector 234 may include injector inlet 272, an injector outlet 274, and an injection orifice 276. The injector 234 may further include a check valve 246 located within or adjacent to injector outlet 274. It shall be appreciated that the injector 234 may be employed with either the injector system 20 or the injector system 120, as shown in FIGS. 1 and 4, respectively. The check valve 246 may serve the same function as the check valves 36 and 136 (see FIGS. 1 and 4). The check valves 36 and 136 may be omitted from the outlet lines 70 and 170 (see FIGS. 1 and 4) when the injector 234 is used. The injector 234 may not include a metering orifice at the injector outlet 274. This is because the check valve 246, when positioned at the injector outlet 274, may essentially perform the same function as the metering orifice 77 (see FIGS. 1-2) and therefore may eliminate the need for a separate orifice. Incorporating the check valve 246 into injector 234 may potentially reduce the complexity and cost of the injection system 20, 120 by reducing the number of parts.

Figure 6:
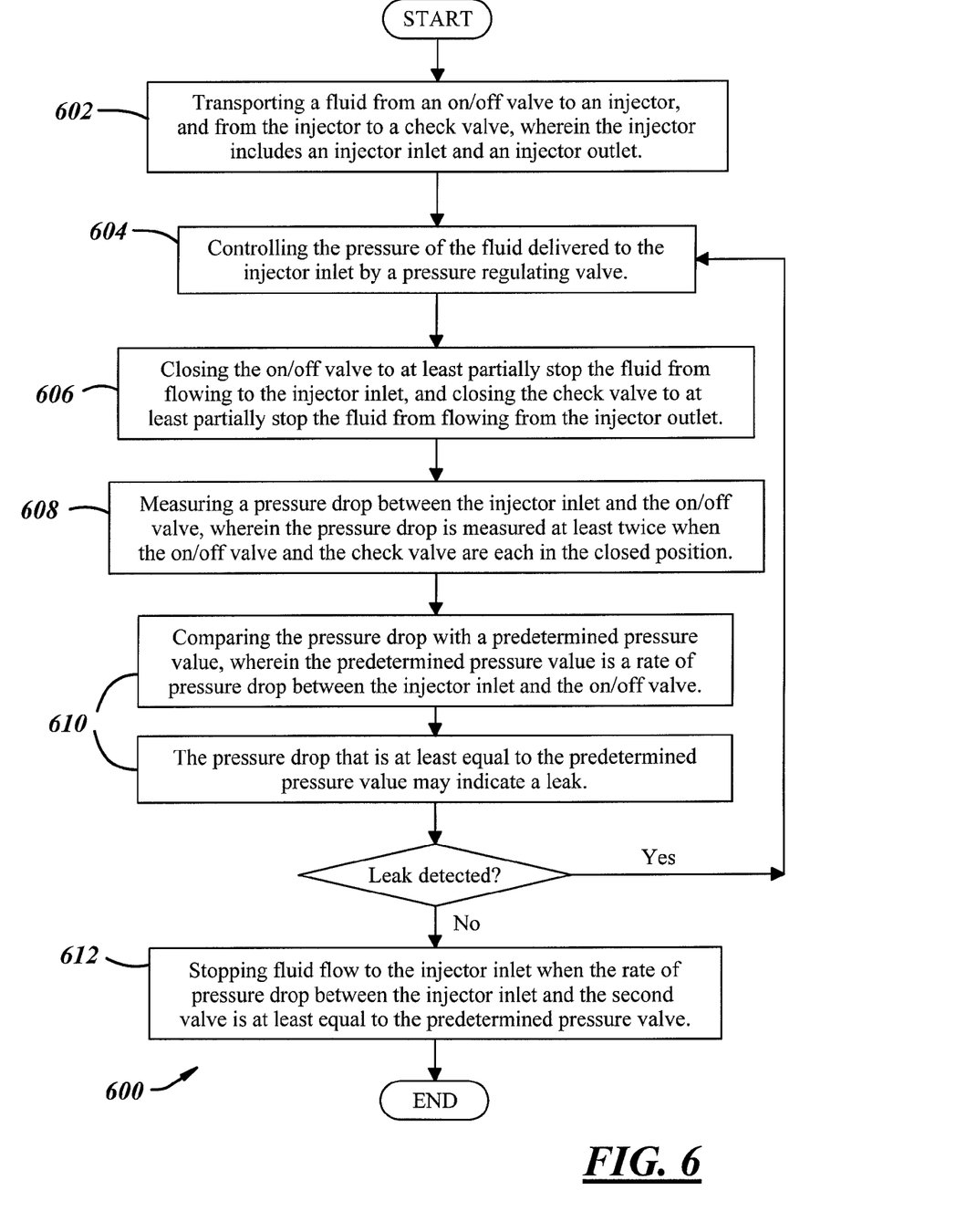
FIG. 6 is a flow chart generally illustrating the steps in a process of detecting a leak in an injection system in accordance with an embodiment of the invention.

FIG. 6 illustrates a method and/or process 600 of detecting a leak in the injection system 20, 120. Process 600 may begin at step 602, where the fluid 50, 150 may be transported from the pump 30, 130 to the on/off valve 40, 140, and from the on/off valve 40, 140 to the injector 34, 134, 234. The fluid 50, 150 may then flow from the injector 34, 134, 234 to the check valve 36, 136. As discussed above, the injector 34, 134, 234 may include the injector inlet 72, 172, 272 and the injector outlet 74, 174, 274. The on/off valve 40, 140 may be in fluid communication with the injector 34, 134, 234 by way of the pressure line 64, 164, and the check valve 36, 136 may be in fluid communication with the injector 34, 134, 234 by way of the outlet line 70, 170, which is, for example, generally illustrated in FIGS. 1 and 4. Process 600 may then proceed to step 604.

In step 604, the pressure of the fluid 50, 150 delivered to the injector inlet 72, 172, 272 may be controlled by the pressure regulating valve 32, 132. For example, as generally illustrated in FIG. 1, the pressure regulating valve 32 may control the pressure of the fluid 50 delivered to the injector 34. The pressure of fluid 50, 150 may be controlled by adjusting the portion of the fluid 50, 150 from the pump delivery line 28, 128 that passes though the pressure regulating valve 32, 132. The fluid 50, 150 may then be transported back to the reservoir 38, 138 by way of a reservoir inlet line 60, 160. The remaining fluid 50, 150 that is not transported through the pressure regulating valve 32, 132 may then be transported through the on/off valve 40, 140 to the pressure line 64, 164. Process 600 may then proceed to step 606.

In step 606, the on/off valve 40, 140 may be closed to at least partially stop the flow of the fluid 50, 150 to the injector inlet 72, 172, 272. Moreover, the check valve 36, 136 may be also closed to at least partially stop the flow of the fluid 50, 150 from the injector outlet 74, 174, 274. As discussed above, the on/off valve 40, 140 and the check valve 36, 136 may be closed when the injection system 20, 120 is in the leak detection mode. The injection system 20, 120 may include the leak detection system for evaluating whether the injector 34, 134, 234 may be leaking the fluid 50, 150. Moreover, the leak detection system may also determine whether the fluid 50, 150 may be escaping from the injection system 20, 120 between the pressure sensor 44, 144 and the check valve 36, 136. Process 600 may then proceed to step 608.

In step 608, a pressure drop may be measured between the injector inlet 72, 172, 272 and the on/off valve 40, 140, where the pressure drop may be measured when the on/off valve 40, 140 and the check valve 36, 136 are in the closed position. More specifically, when the injection system 20, 120 goes into the leak detection system (e.g., operates in the leak detection mode) both of the check valve 36, 136 and the on/off valve 40, 140 are each closed, and the fluid 50, 150 located between the check valve 36, 136 and the on/off valve 40, 140 may be restricted. The leak detection system may work as the pressure sensor 44, 144 monitors the pressure drop in the pressure line 64, 164 over a period of time. That is, the pressure sensor 44, 144 may take at least two measurements of pressure in the pressure line 64, 164. Process 600 may then proceed to step 610.

In step 610, the pressure drop may be compared with the predetermined pressure value, where the predetermined pressure value is a rate of pressure drop between the injector inlet 72, 172, 272 and the on/off valve 40, 140. The leak detection system may work when the pressure sensor 44, 144 indicates whether pressure in the pressure line 64, 164 has exceeded the predetermined pressure value, where the predetermined pressure value may be a pressure drop in the pressure line 64, 164 over a rate of time. That is, pressure in the pressure line 64, 164 may be measured multiple times after the check valve 36, 136 and the on/off valve 40, 140 have closed.

If the pressure drop is greater than the predetermined value, process 600 may then return to step 604. If the pressure drop is at least equal to the predetermined value, then process 600 may proceed to step 612.

In step 612, flow of the fluid 50, 150 to the injector inlet 72, 172, 272 may be stopped when the rate of pressure drop between the injector inlet 72, 172, 272 and on/off valve 40, 140 is at least equal to the predetermined pressure value. That is, the pressure line 64, 164 is monitored to determine the amount of pressure loss, and if the amount of pressure loss exceeds the predetermined pressure value, then the injection system 20, 120 may shut down. The controller 42, 142 may send a signal through at least one of the pressure regulating valve electrical connection 54, the on/off valve electrical connection 56 and the pump electrical connection 58 indicating that the pressure in the pressure line 64, 164 is less than the predetermined pressure value. In one example, the pump 30, 130 may be shut off to reduce flow of the fluid 50, 150 to the injector inlet 72, 172, 272. The pressure regulating valve 32, 132 may open, and the on/off valve 40, 140 may close. In another example, if the pump 30, 130 continues to run, then the pressure regulating valve 32, 132 may be left open to prevent damage from occurring within the injection system 20, 120. Process 600 may then terminate. One or more of the steps of the method and/or process of detecting a leak in the injection system 20, 120 may be repeated in connection with the injection system 20, 120.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. An injection system comprising:
    an injector including a first injector outlet including an injection orifice, an injector inlet, and a second injector outlet;
    a check valve in communication with the second injector outlet, the check valve including a closed position for at least partially stopping fluid flow from the second injector outlet;
    a second valve in communication with the injector inlet through a pressure line, the second valve including a closed position for at least partially stopping fluid flow to the injector inlet;
    a pressure sensing device configured for sensing variations in pressure within the pressure line; and
    a controller configured to compare a rate of pressure decrease measured by the pressure sensing device and a predetermined value and determine whether a leak is present on the basis thereof;
    wherein the controller is configured to make the rate of pressure decrease used in the comparison to be a rate measured over a period of time during which the check valve and the second valve are closed.

2. The system of claim 1, further comprising an orifice configured to restrict flow from the injector through the check valve.

3. The system of claim 1, wherein the controller is configured to stop further supply of fluid to the injector if it has determined that a leak is present.

4. The system of claim 1, wherein the controller is to configured to signal the presence of a leak if it has determined that a leak is present.

5. The system of claim 1, wherein the predetermined value is determined from a rate of pressure decrease within the pressure line measured previously with the check valve and the second valve closed.

6. The system of claim 5, wherein the controller is configured to operate the injector at pressures at which the check valve is open.

7. The system of claim 1, further comprising:
    a fluid reservoir;
    a pump configured to draw fluid from the reservoir and supply the pressurized fluid to the second valve through a pump delivery line; and
    a return line connecting the check valve to the reservoir.

8. The system of claim 7, further comprising a pressure control valve configured to regulate a flow of the fluid from the pump delivery line to the return line bypassing the injector.

9. The system of claim 8, wherein the controller is configured to operate the pressure control valve to control the pressure in the pressure line while the second valve is open.

10. The system of claim 9, wherein the controller is configured to open the pressure control valve to reduce leakage through the second valve while the variations in pressure within the pressure line are being sensed.

11. A method of detecting a leak in an injection system, comprising:
    opening a first valve to place the injector in communication with a supply of pressurized fluid drawn from a reservoir;
    operating the injector to inject into an exhaust line a portion of the fluid supplied to the injector;
    returning a portion of the fluid supplied to the injector to the reservoir through a check valve;
    closing the first valve;
    allowing the check valve to close;
    measuring the pressure in a pressure line between the first valve and the injector over a period of time during which the first valve and the check valve are closed;
    comparing the rate of decrease in the measured pressure to a predetermined value; and
    determining whether a leak is present on the basis of the comparison.

12. The method of claim 11, further comprising:
    decreasing the pressure on a supply side of the first valve to a reduced pressure;
    wherein the pressures used to determine the rate of pressure decrease are measured with the supply side pressure so reduced.

13. The method of claim 11, further comprising:
operating a pump to supply the pressurized fluid to the first valve through a pump delivery line;
returning a portion of the fluid from the pump delivery line to the reservoir through a pressure regulating valve;
while operating the injector, controlling the pressure regulating valve to regulate the pressure in the pressure line.

14. The method of claim 13, further comprising:
opening the pressure regulating valve to reduce the pressure in the pressure line prior to taking the measurements;
using the pressure regulating valve to maintain a reduced pressure in the pressure line while taking the measurements.

15. The method of claim 11, wherein the predetermined value is determined from a previous measurement of a rate of decrease of the pressure in the pressure line with the first valve and the check valve closed.

16. The method of claim 15, further comprising:
signaling if a leak is detected.

17. The method of claim 15, further comprising:
stopping a further operation of the injector if a leak is detected.

18. The method of claim 15, wherein the injector comprises a metering orifice that reduces the flow rate from the injector to the check valve.

19. The method of claim 15, wherein operating the injector to inject a portion of the fluid comprises pulse width modulation.

20. The method of claim 15, wherein the predetermined value is stored in a controller.

* * * * *